Figures 1, 2, 3:
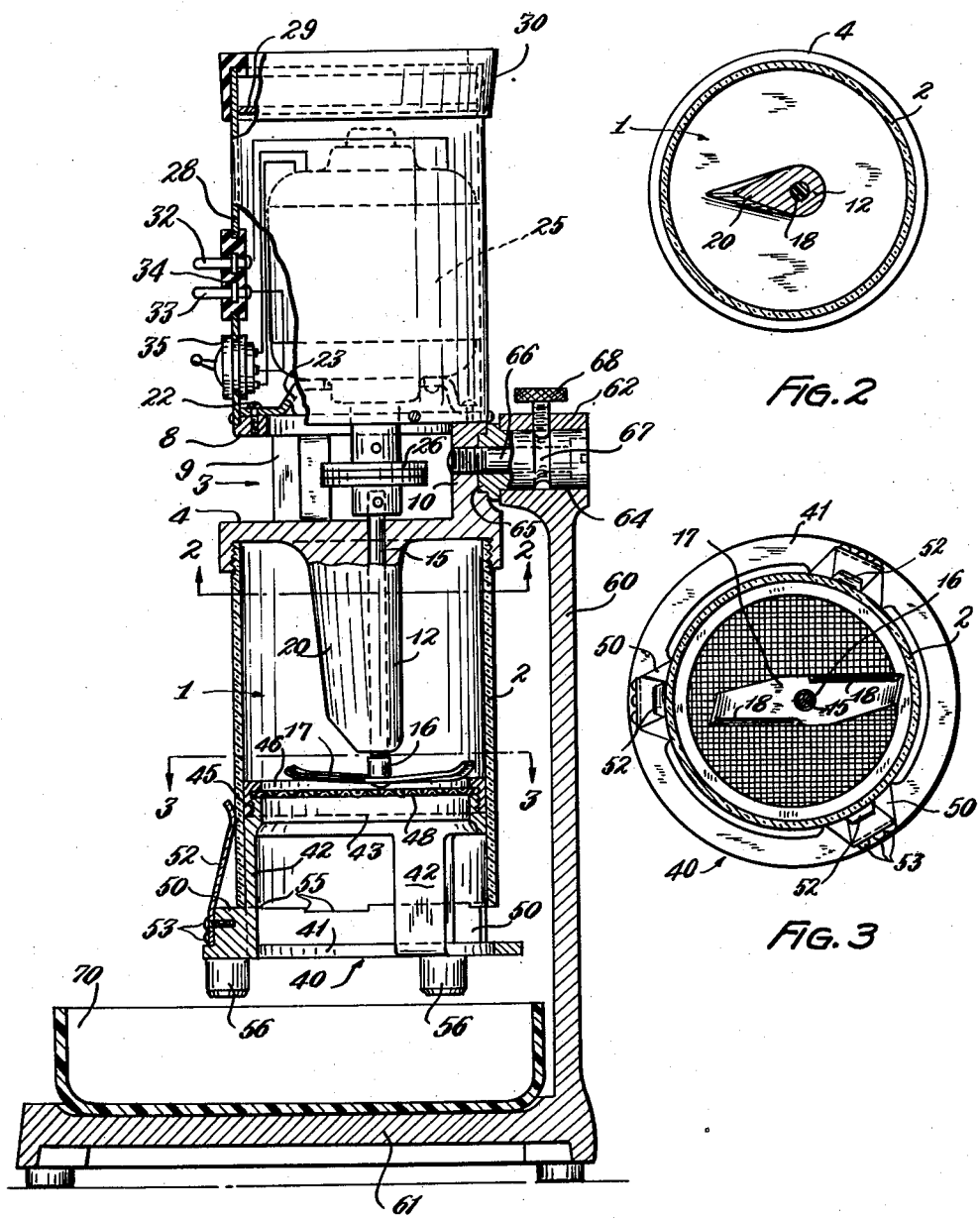

June 13, 1950 J. M. MARTY 2,511,357
CUTTER OR DISINTEGRATOR FOR
SEEDS, GRAINS, OR THE LIKE
Filed Aug. 4, 1948 2 Sheets-Sheet 1

INVENTOR.
JOHN M. MARTY
BY West + Oldham
ATTORNEYS

June 13, 1950 — J. M. MARTY — 2,511,357
CUTTER OR DISINTEGRATOR FOR SEEDS, GRAINS, OR THE LIKE
Filed Aug. 4, 1948 — 2 Sheets-Sheet 2

INVENTOR.
JOHN M. MARTY
BY West & Oldham
ATTORNEYS

Patented June 13, 1950

2,511,357

UNITED STATES PATENT OFFICE 2,511,357

CUTTER OR DISINTEGRATOR FOR SEEDS, GRAINS, OR THE LIKE

John M. Marty, Lakewood, Ohio

Application August 4, 1948, Serial No. 42,455

2 Claims. (Cl. 146—76)

This invention relates to that class of machines used for processing foods, and it has to do more particularly with food cutters or disintegrators.

An object of the invention is to provide a machine of the aforesaid class that is relatively simple of construction and highly efficient and that, by a simple alteration or by a simple adjustment, or both, is rendered capable of handling various kinds of grains or seeds of a wide range of sizes, as well as other foods, and of variously processing or treating them, it being an important object of my invention to provide a machine that will effectively shell sunflower seeds and deliver the kernels, separated from the chaff, either whole, or in granular form of varying degrees of coarseness, or as a meal. The attainment of the particular result desired is dependent upon the use of a screen or foraminous element of the required mesh or aperture size through which the product of the machine is discharged.

Sunflower seeds are mentioned in particular because of their increasing popularity as a food for humans, and because of the mediocre methods heretofore employed for preparing them for such use.

Another object of the invention is to provide a machine of the above mentioned class that is thoroughly dependable; that is durable in service, and that is not subject to clogging.

Another object is to provide a food cutter or disintegrator that is especially convenient of use, and that is of a size and weight well adapting it to domestic purposes, and that is easily cleaned and thoroughly sanitary.

A further object of my invention is to provide a food cutting unit or attachment incorporating my improvements that is adapted for application to the bases and associated driving means of food processing machines of certain prevailing types, whereby the benefits of my invention are made available, at minimum expense, to owners of such machines.

The foregoing objects, with others hereinafter appearing, are attained in the embodiments of my invention illustrated in the accompanying drawings, wherein like reference characters designate similar parts throughout the several views; and while I shall proceed to describe said embodiments in detail, it will be understood that changes and alterations may be made without departing from the invention provided they come within the scope of the appended claims.

Figures 4, 5:
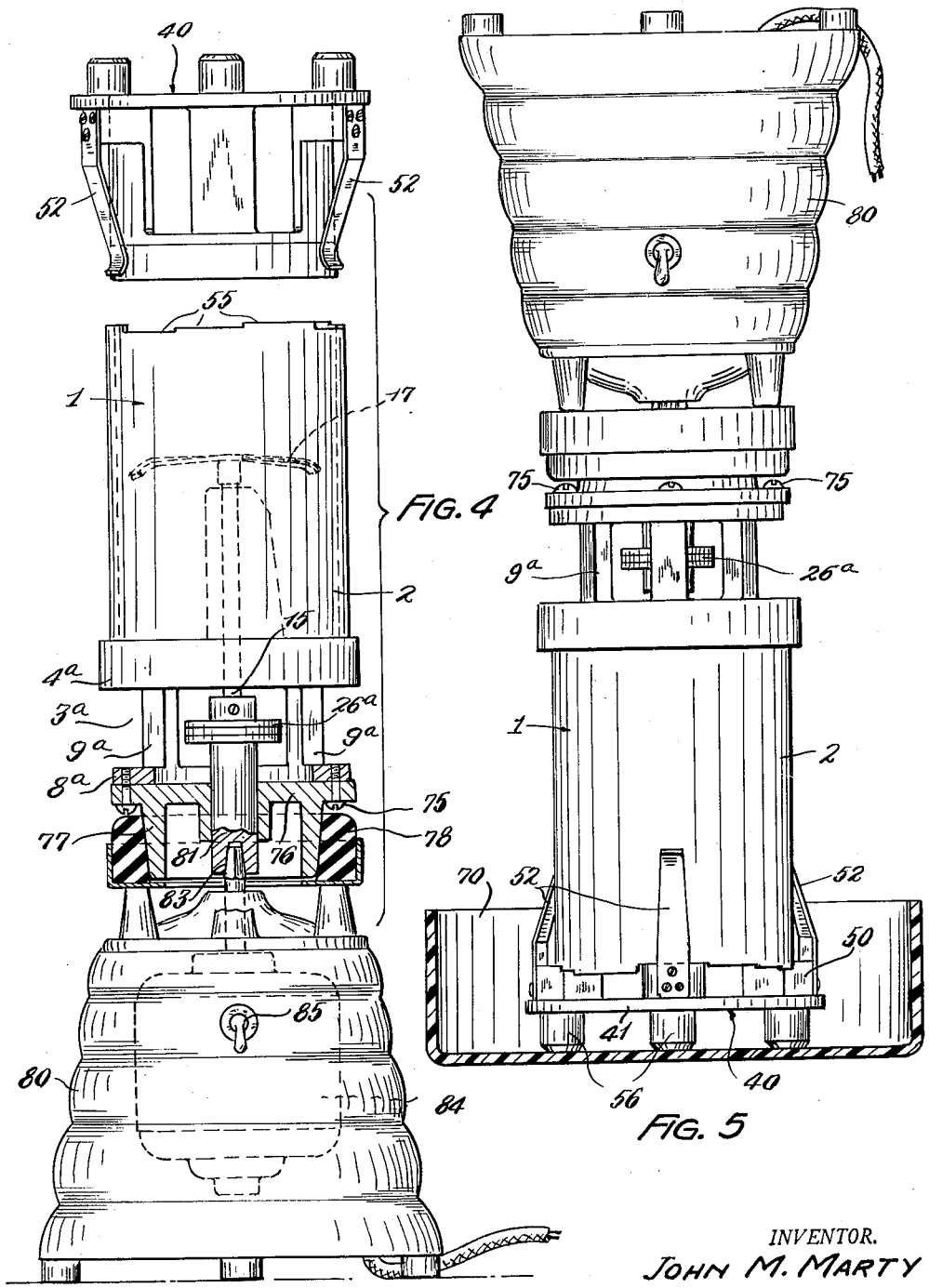

In the drawings, Fig. 1 is a sectional side elevation of a food cutter or disintegrator constructed in accordance with my invention; Figs. 2 and 3 are transverse sectional views taken on the respective lines 2—2 and 3—3 of Fig. 1; Fig. 4 is a side elevational view, with certain parts shown in section, of a food cutting unit or attachment incorporating my improvements, the same being shown as applied to the base of a food processing machine of prevailing type and operatively connected to the driving means that is housed within said base, the present view showing the apparatus in a position to receive the material to be processed, and with the mounting that incorporates the screen or foraminous element removed from the container; and Fig. 5 shows the apparatus of Fig. 4 inverted and supported in operative condition within a receptacle.

In the embodiment of the invention illustrated in Figs. 1 to 3, the container for the material to be treated, and which is designated, generally, by the reference numeral 1, has a peripheral wall 2 that preferably consists of a cylinder of transparent material, such as glass or, more desirably, Lucite or other clear transparent plastic. Applied to and closing one end of the cylindrical wall 2 is a supporting member denoted, generally, by the reference numeral 3. A flanged, disk-like portion 4 of said member is attached to the end of the wall 2, desirably in such manner that the supporting member may be removed from said wall, as by a threaded connection as shown. Also included in the supporting member 3 is a ring-like part 8 that is rigidly connected to the part 4 by a number of posts, three in the present instance, that are spaced equal distances apart circumferentially of the member. Two of the posts, designated 9 and 10, respectively, are shown in Fig. 1. An elongated boss 12 depends from the part 4 of the member 3 into the container 1, and it has a longitudinal bore within which a shaft 15 is journaled, said shaft extending above the part 4 and below the lower end of the boss; and to the protruding lower end of the shaft is fastened the hub 16 of a rotary cutter 17. Said cutter is shown as consisting of two blades that are very gradually inclined upwardly toward their outer ends (as the cutter is viewed in Fig. 1) and then curved upwardly rather abruptly. Considering the direction of rotation of the cutter, the advancing edges of the blades are chamfered, as indicated at 18 in Fig. 3, and the cutter is desirably characterized by a very slight pitch, similar to that of a propeller.

It will be observed that the shaft 15 is somewhat off center with respect to the container 1, due to the eccentricity of the bore of the boss 12 with respect to the disk-like part 4 of the supporting member 3; and the boss 12 is formed with a laterally extending rib-like portion or fin 20. The reason for the eccentricity of the rotary cutter with respect to the cylindrical container, and the inclusion of the fin 20, will presently appear.

Surmounting the member 3, and attached to the ring-like part 8 thereof by screws 22, is a so-called "adapter" 23 that mounts an electric motor 25 of suitable size, and which is desirably two-speed, the motor being arranged with its shaft approximately aligned with the previously mentioned shaft 15 and connected thereto by a coupling 26, one especially suited to the purpose being that disclosed in my prior Patent No. 2,079,460, dated May 4, 1937.

Enclosing the motor 25 is a cylindrical housing 28 which is closed at its upper end by a wall 29 that is inset a distance from the upper end of the peripheral wall of the housing. Applied to the upper end of said wall is an annular pad 30 of rubber or other resilient material. The lower end of the peripheral wall of the housing 28 bears on a shoulder of the supporting member 3 that is provided by reducing the upper end of the ring-like part 8 of said member, the base flange of the adapter 23 corresponding in diameter substantially to that of said reduced end. Electric current may be supplied to the motor 27, from any suitable outlet, through a cord or cable (not shown) such as that employed with electric flat-irons. The conventional fitting of such cord is adapted to be applied to terminal members 32 and 33 that are carried by a block 34 of insulating material that is fixed within an opening of the peripheral wall of the housing 28. Similarly mounted within an opening of said wall is the casing of an electric switch 35. The electrical conductors comprising the circuit including the motor, said terminal members, and the switch, are diagrammatically shown in Fig. 1.

Fitting within the end of the peripheral wall 2 of the container 1 remote from the supporting member 3 is the reduced end of a mounting designated generally by the reference numeral 40. This mounting comprises a flat, relatively large ring 41 that is rigidly connected, by ties 42, with an annular part 43 of lesser diameter than said ring. The upper end portion of the part 43 is reduced in diameter and externally threaded for the application of an internally threaded clamping ring 45, between an inwardly directed end flange 46 of which, and the adjacent end of the part 43, the edge portion of a foraminous element or screen 48 is clamped. Said element or screen 48 is thus removably attached to the mounting 40, so that elements or screens of different aperture size or mesh may be interchangeably used with said mounting. The kind of material to be treated, and the character of the desired product, determine the aperture size or mesh of the selected element or screen. Radially outwardly extending lugs 50 occupy the angles between the lower ends of the ties 42 and the ring 41, and their flat top surfaces are adapted to be engaged by the adjacent end of the cylindrical wall 2 when the mounting is applied to the container, as shown in Fig. 1. In order to frictionally hold the mounting to the container, the former is provided with resilient fingers 52 which have their lower ends connected by screws 53 to the outer ends of the lugs 50, and their opposite ends suitably curved and sprung inwardly for firm frictional contact with the wall 2. It will be observed from Fig. 1 that the end of the wall 2 that receives the mounting 40 is provided with series of shallow steps 55, the corresponding ones of the different series being arranged to simultaneously contact the lugs 50. By this means of adjustment the foraminous element or screen 48 may be variably spaced definite distances from the cutter 17. Accordingly, the machine may be altered to better adapt it to different foods, and to different sizes of seeds or grains, and to determine the coarseness or fineness of the product. Furthermore, by the selection of an element or screen of large enough aperture size or mesh, the machine may be caused to deliver the kernels of seeds or grain whole.

The mounting 40 is shown as provided with feet 56, which are desirably made of rubber or other resilient material and are suitably secured to the underside of the ring 41. The purpose of these feet will be brought out in the description of the operation of the machine.

While the foregoing constitutes a complete embodiment of the invention, the ultimate development of such embodiment includes a pedestal 60 that rises from one side of a base 61 and terminates at its upper end in a sleeve-like bearing 62. Journaled in said bearing is a trunnion 64, shown as flanged adjacent its inner end and as provided with a transverse key portion 65 that is adapted to non-rotatably seat within a keyway formed in the outer side of the post 10 of the supporting member 3. The trunnion has an axial bore that registers with a threaded hole in the post 10, and a screw 66 is projected inwardly through the bore of the trunnion and threaded into the hole of the post 10 to bind the trunnion to the supporting member. The head of said screw is received by a counterbore of the trunnion, as indicated by dotted lines in Fig. 1. Intermediate its ends, the trunnion is surrounded by a groove 67 that receives the inner end of a thumb screw 68 that is threaded through the wall of the bearing 62. This screw serves to prevent withdrawal of the trunnion from the bearing, and also, when tightened, to lock the trunnion within the bearing in different positions of angular adjustment. A dish or receptacle 70 is adapted to be supported upon the base 61.

In the use of the apparatus or machine above described, the thumb screw 68 is loosened enough to permit rotation of the trunnion 64. The structure supported by the trunnion, including the container 1, may now be inverted from the position shown in Fig. 1 to dispose the mounting 40 at the top. The screw 68 may be tightened, if desired, to hold said structure in its present position, and the mounting 40 is withdrawn from the container. The material to be treated—such as sunflower seed, for example—is dumped into the container until the container is about half full, more or less. The mounting is then replaced, with the lugs 50 engaged with the appropriate ones of the series of steps 55 to properly space the foraminous element or screen 48 from the cutter 17. The mounting is firmly held to the container by the spring fingers 52. Now, with the screw 68 loosened, the structure may be reversed to its former operative position, as shown in Fig. 1, so as to dispose the mounting 40 over the receptacle 70, after which the screw 68 is again tightened. If the kernels of the seeds or grain are to be shelled and delivered whole, or cut into relatively coarse granules, the switch 35 is placed in "slow" position, (for finer cutting, "fast" position is used) and the fitting of a suitable electric cable or cord is applied to the terminal members 32 and 33. This energizes the motor and causes it to drive the cutter 17 at the required speed. With the cutter operating, the shells of the seed or grain are ruptured and removed and the whole kernels fall through the openings of the foraminous element or screen 48, provided said openings are large enough to permit of their passage, or the kernels are cut into granules and discharged through said openings if the latter are smaller than the original size of the kernels, all according to the adjustment of the foraminous element or screen, and the size of the openings therein. The product falls into the receptacle 70, and when a high percentage of the kernels have been discharged or reduced and delivered to the receptacle, the motor may be stopped by withdrawing the fitting of the cord or cable from the terminal members 32 and 33. Now by loosening the screw 68 and turning the suspended structure at an angle to its operative position, with the container inclined downwardly and the mounting 40 removed, the shells or chaff and residue of the seeds or grain may be dumped from the container 1 into a suitable receiver for disposal.

The eccentricity of the cutter with respect to the peripheral wall of the container 1, and the presence of the fin 20, slow down rotation of the mass of material induced by the rotation of the cutter, thereby producing a better action between the cutter and the portion of the mass immediately adjacent thereto. By upwardly flaring the blades of the cutter with respect to the plane of the foraminous element or screen 48, and also by reason of the slight pitch of the blades, previously referred to, the processed material is prevented from clogging between the cutter and the foraminous element or screen, and the upturned outer ends of the blades avoid packing of the treated material in a ring-like mass between the outer ends of the blades and the peripheral wall of the container, such as would occur from centrifugal force if the end of the blade were straight.

By making the trunnion 68 detachable from the supporting member 3, and by equipping the invertible structure with the pad 30 at one end and feet 56 at the other, I have provided a complete food cutter or disintegrator that may be used without the pedestal 60 and may therefore be had at a corresponding saving. The structure, under such circumstances, is stood upon the pad 30 for filling, and upon the feet 56 for operation, in the latter case either within a suitable pan or receptacle or upon a piece of clean paper or other material for receiving the product.

The form of the invention next to be considered, and which is illustrated in Figs. 4 and 5, is used in the manner just described, since no provisions are made for rotatably supporting it.

In adapting my invention for use with the bases and driving mechanisms of certain conventional types of food mixers, I may utilize the same container and mounting as those above described. In Figs. 4 and 5, the unchanged parts are designated by the same reference characters as are used to denote them in Figs. 1 to 3. In the form of the invention now under consideration, the supporting member is somewhat modified and is designated 3ª. It includes a part 4ª that is attached to one end of the peripheral wall 2 of the container 1, and supported by and in spaced relation to the part 4ª, through posts 9ª, is a flat ring 8ª. Suitably secured, as by screws 75, to the ring 8ª, is a base flange of an adapter 76 that includes a frusto conical part 77. This part is adapted to be frictionally engaged within the resilient socket member 78 that is a part of the base 80 of a food mixer of conventional type. Fastened to the end of the shaft 15 remote from the cutter 17 is a coupling 26ª, having an elongated hub 81 that is journaled in a central hollow boss of the adapter 76 and is provided with an axial socket of a size and shape to nonrotatably receive the end 83 of the shaft of the motor 84 that is housed in the base 80. A switch 85, carried by said base, controls the supply of current to the motor.

The apparatus is shown in Fig. 4 as standing on the base 80, with the container 1 at the top of the structure, and with the mounting 40 removed to permit dumping of material to be treated into the container 1. With the mounting 40 replaced, the apparatus may be inverted and supported by the legs 56 within a dish or receptacle, as shown in Fig. 5. Now, by closing the switch 85, the motor 84 will be energized and the apparatus will be caused to operate in the manner previously described.

Having thus described my invention, what I claim is:

1. In a machine of the class described, the combination of a supporting member, a cylindrical wall having one of its ends attached to one end of said member and constituting a container for the material to be treated, a shaft journaled in the supporting member and extending into the container longitudinally thereof and in eccentric relation to said cylindrical wall, a sleeve-like bearing on the supporting member projecting into the container and wherein the shaft is journaled, a fin extending laterally from the said bearing in the direction of the part of said wall furthest spaced from the shaft, a rotary cutter secured to the end of the shaft within the container, an annular mounting having a portion for insertion into the end of the cylindrical wall opposite the supporting member, a screen supported by the mounting across the interior of the container, the mounting having stop means for contact with the adjacent end of the cylindrical wall thereby to space the aforesaid screen a given distance from the cutter, resilient means on the mounting frictionally engaging the cylindrical wall for holding the mounting to said wall, driving means mounted on the supporting member and located beyond the end thereof remote from the aforesaid container, operative connections between said driving means and the aforesaid shaft, and a housing mounted on the supporting member and enclosing the driving means.

2. In a machine of the class described, the combination of a supporting member, a cylindrical wall having one of its ends attached to one end of said member and constituting a container for the material to be treated, a shaft journaled in the supporting member and extending into the container longitudinally thereof, a sleeve-like bearing on the supporting member projecting into the container and wherein the shaft is journaled, a rotary cutter secured to the end of the shaft within the container, an annular mounting having a portion for insertion into the end of the cylindrical wall opposite the supporting member, a screen detachably connected to the mounting and supported thereby across the interior of the container in spaced relation to the cutter, the end of the cylindrical wall to which the mounting is applied having series of steps, and the mounting having outwardly extending lugs for contact with corresponding steps of said series for variably spacing the aforesaid screen from the cutter, spring fingers secured to the outer ends of said lugs and frictionally engaging the outer surface of the cylindrical wall for holding the mounting to the wall, driving means mounted on the supporting member and located beyond the end thereof remote from the aforesaid container, a cylindrical housing enclosing the driving means and being of substantially the same diameter as the aforesaid cylindrical wall and being substantially axially aligned therewith, operative connections between said driving means and the aforesaid shaft, supporting means applied to the end of said housing remote from the supporting member, and further supporting means on the aforesaid mounting.

JOHN M. MARTY.

REFERENCES CITED

The following references are of record in the file of this patent:

UNITED STATES PATENTS

| Number | Name | Date |
|---|---|---|
| 243,083 | Rodenberg | June 21, 1881 |
| 340,635 | Stead | Apr. 27, 1886 |
| 467,325 | Waters | Jan. 19, 1892 |
| 599,728 | Otto | Mar. 1, 1898 |
| 600,575 | Cross | Mar. 15, 1898 |
| 634,771 | Smith | Oct. 10, 1899 |
| 803,061 | Kenyon | Oct. 31, 1905 |
| 1,188,151 | Chapman | June 20, 1916 |
| 1,391,145 | Smetana | Sept. 20, 1921 |
| 1,480,969 | Thomson | Jan. 15, 1924 |
| 1,923,867 | Koe | Aug. 22, 1933 |
| 2,315,018 | Lawrence | Mar. 30, 1943 |
| 2,352,232 | Strauss | June 27, 1944 |

FOREIGN PATENTS

| Number | Country | Date |
|---|---|---|
| 481,905 | Germany | Sept. 2, 1929 |